United States Patent [19]

Akiyama et al.

[11] Patent Number: 4,575,242

[45] Date of Patent: Mar. 11, 1986

[54] SLIT MECHANISM FOR USE IN A MONOCHROMATOR

[75] Inventors: Osamu Akiyama; Rikuo Hira, both of Kyoto, Japan

[73] Assignee: Shimadzu Corporation, Kyoto, Japan

[21] Appl. No.: 542,151

[22] Filed: Oct. 14, 1983

[30] Foreign Application Priority Data

Oct. 29, 1982 [JP] Japan ................................ 57-191305

[51] Int. Cl.$^4$ ............................ G01J 3/04; G01J 3/18
[52] U.S. Cl. ...................................... 356/331; 356/334; 350/271
[58] Field of Search ............................. 356/331–334, 356/319; 350/271, 273

[56] References Cited

U.S. PATENT DOCUMENTS 3,508,813  4/1970  Smith, Jr. et al. ................. 356/334
3,708,227  1/1973  Krakow et al. ..................... 350/271

FOREIGN PATENT DOCUMENTS 137117  10/1981  Japan ................................ 356/334
 88625   5/1983  Japan ................................ 350/271
1118969  7/1968  United Kingdom ................ 356/334

OTHER PUBLICATIONS

Brochure-New McPherson High Performance Scanning Monochromator, Model 2051.

*Primary Examiner*—F. L. Evans
*Attorney, Agent, or Firm*—Fidelman, Wolffe & Waldron

[57] ABSTRACT

A slit mechanism for use in a monochromator which is capable of changing not only the slit width but also the slit height. The slit mechanism is provided with a plurality of pairs of slits formed in a disk rotatable about an axis. The two slits in each pair have the same width and the same height, and each pair of slits have a different width from those of the other pairs of slits. The slit mechanism is further provided with at least one additional pair of slits having the same width as the width of, and a different height from the height of, a predetermined pair of the plurality of pairs of slits. All the pairs of slits are arranged circumferentially of a circle on the disk concentric with the axis of rotation of the disk, so that each pair of slits are positioned diametrically opposite to each other on the circle so as to serve as an entrance and an exit slit, respectively, for the monochromator. The slits may also be arranged on a disk circumferentially of two circles of different diameters concentric with each other and the axis of rotation of the disk, so that one slit in each pair is on one of the two circles while the other slit in the pair is on the other circle diametrically opposite to the one slit.

6 Claims, 2 Drawing Figures

SLIT MECHANISM FOR USE IN A MONOCHROMATOR

BACKGROUND OF THE INVENTION

This invention relates to a slit mechanism for use in a monochromator, in which the slit width is changed by selectively using a plurality of slits each having its own fixed width.

In a known slit mechanism wherein a plurality of slits having a fixed width are exchanged for selective use, all the slits have the same height which is determined in accordance with the height of the slit of the smallest width. This determination, however, has no reasonable theoretical base. A slit of a narrow width is used to obtain a sufficient resolution of wavelength. If a slit has too great a height, the curvature of the spectral image of the slit along the height thereof reduces the monochromaticity of the output light under measurement. Therefore, the height of the slit is determined with a view to attaining a required wavelength resolution. A slit of a large width is selected to obtain a high intensity. In this case, however, the resolution is reduced as the slit width is broadened, and there is no design factor by which the height of each slit is determined, so that the heights of all the slits are determined simply to conform to that of the slit of the narrowest width.

The intensity of the output light emerging from a monochromator is propositional to the square of the width of the exit slit. In particular, if the entrance and exit slits have a height h and a width w, the intensity of the output light coming out of the exit slit is given as $Khw^2$ where K is a constant. Therefore, if the width of the slit is doubled with the height thereof remaining unchanged, the intensity of the output light is quadrupled, and if the height of the slit of the double width is halved, the intensity of the light from the slit is halved, that is, reduced to half the original intensity.

On the other hand, the surface of a diffraction grating considerably scatters the light incident thereon, and some of the scattered light reaches the exit slit as stray light, which obstructs the measurement of spectra. In a monochromator, in addition to the above-mentioned scattered light from the grating the scattered light from various other optical elements such as collimating mirrors and the inner wall surface of the casing causes stray light. The amount of the stray light is proportional to the amount of light incident on the grating and other elements and also to the area of the exit slit, that is, the square of the slit width w and the square of the slit height h and is given as $K'h^2w^2$ where $K'$ is a constant. Therefore, the ratio of the intensity of the stray light to that of the output light, that is, the stray light level P is given as $P = K'h^2w^2/Khw^2 = (K'/K)h$.

If the slit width is doubled, the intensity of the spectrum obtained and the intensity of the stray light are both quadrupled, that is, four times the intensity obtained with the original slit width, so that the stray light level P remains unchanged. However, if the height of both slits is halved, the intensity of the spectrum is halved or becomes half the intensity obtained with the original slit height since $4 \times \frac{1}{2} = 2$ while the intensity of the stray light is reduced to one quarter or becomes equal to the intensity obtained with the original slit height since $4 \times (\frac{1}{2})^2 = 1$, so that the stray light level P is reduced to one half the level with the original slit height.

In conventional monochromators in which the slit width is variable, no consideration was given to stray light and the slit height is kept unchanged.

SUMMARY OF THE INVENTION

Based on the fact that the stray light level is proportional to the height of the slit, this invention provides a slit mechanism for use in a monomchromator, in which the height as well as the width of the slit can be changed.

In accordance with this invention, the slit mechanism comprises a plurality of pairs of slits formed in a slit disk made of rigid, opaque material and rotatable about an axis. The two slits in each pair have the same width and the same height, and each pair of slits have a different width from those of the other pairs of slits. The slit mechanism further comprises at least one additional pair of slits having the same width as the width of, and a height different from the height of, a predetermined pair of the plurality of pairs of slits.

In one preferred embodiment of the invention, all the pairs of slits are arranged on the disk circumferentially of a circle concentric with the axis of rotation of the rotatable slit disk, so that each pair of slits are positioned diametrically opposite to each other on the circle so as to serve as an entrance and an exit slit, respectively, for the monochromator.

In another preferred embodiment of the invention, the slits are arranged on the disk circumferentially of two circles of different diameters concentric with each other and the axis of rotation of the slit disk so that one slit in each pair is on one of the concentric circles while the other slit in the pair is on the other circle diametrically opposite to the one slit.

DETAILED DESCRIPTION OF PREFERRED EMBODIMENTS

Figure 1:
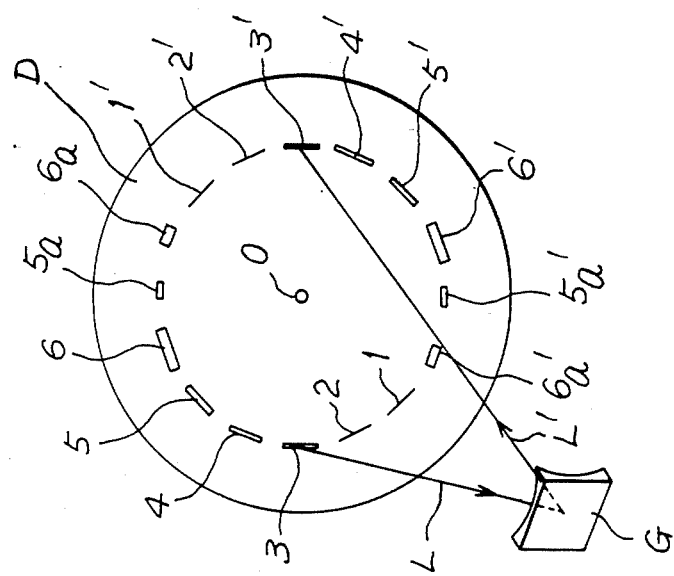
FIG. 1 is a front view of the slit disk in one embodiment of the invention, with a schematic perspective view of a diffraction grating.

Referring to FIG. 1, there is shown a slit disk D made of rigid, opaque material and rotatable about an axis O. A plurality of pairs of slits 1, 1', 2, 2', 3, 3', 4, 4', 5, 5', 5a, 5a', 6, 6', 6a, 6a' are formed in the disk and spaced a suitable angular distance apart from each other along a circle on the disk concentric with the axis O. Each pair of slits at diametrically opposite sides on the circle have the same width and the same height. While one of each pair of slits is an entrance slit, the other is an exit slit.

In FIG. 1, the slits 3 and 3' are in operative position and a beam of light L from a source not shown passing through the entrance slit 3 impinges on a grating G so as to be dispersed into different wavelengths, a selected one L' of which passes through the exit slit 3'. As can be easily seen, any desired one of the pairs of slits can be brought to the operative position by rotating the slit disk D for a corresponding angle.

In the illustrated embodiment, the slits 1 and 1' have the narrowest width which corresponds to a spectral bandwidth of 0.2 nm; the slits 2 and 2' have the second narrowest width corresponding to a spectral bandwith of 0.5 nm; and the slits having a higher and higher number have a greater and greater width corresponding to a spectral bandwidth of 1, 2, 3 and 5 nm, successively.

There are two pairs of slits 6, 6' and 6a, 6a' which have the same greatest width of 5 nm. The slits 6 and 6' have the standard height while the slits 6a and 6a' have a height half the standard height. Similarly, the slits 5 and 5' have the second greatest width of 3 nm and the standard height while the slits 5a and 5a' have the same second greatest width of 3 nm and a height half the standard height. Here, the standard height means the height of the slits having widths of 0.2, 0.5, 1 and 2 nm, respectively.

Figure 2:
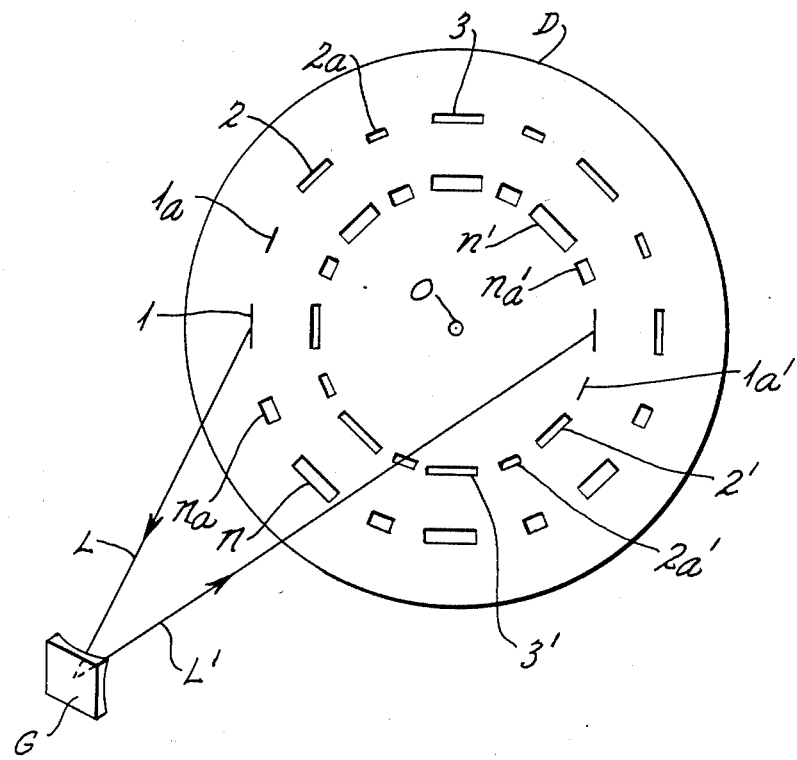
FIG. 2 is a view similar to FIG. 1 but showing a modified form of the slit disk.

FIG. 2 shows another embodiment of the invention, wherein the slit disk D is provided with a plurality of slits 1, 1', 1a, 1a', 2, 2', 2a, 2a', 3, 3', ..., n, n', na, na' arranged along two circles of different diameters concentric with each other and the axis O of the slit disk D. When the slits 1, 1a, 2, 2a, 3, 3a, ..., n, na on the outer circle operate as an entrance slit, the slits 1', 1a'. 2', 2a', 3', ..., n', na' on the inner circle operate as an exit slit. This means that each of the slits on one of the circles is paired with that one of the slits on the other circle which has the same width and the same height and is positioned at a diametrically opposite side.

In the illustrated embodiment of FIG. 2, there are eight different slit widhts, that is, 0.1, 0.2, 0.3, 1, 2, 3, 4, and 5 nm, and there are two different slit heights, with the smaller height being one-third of the greater height.

As is well known, generally in absorption spectrophotometry analysis employing a spectrophotometer a slit width smaller than one-tenth of the half bandwidth on an absorption spectrum peak enables measurement with a sufficiently high degree of reliability. In absorption spectra in the visible and ultraviolet regions the half bandwidth lies between 20 and 50 nm, so that measurement is usually conducted with a slit width of 2 to 5 nm.

The slit disk of FIG. 1 is provided with two pairs of slits of 5 nm width having a greater and a smaller height. As previously mentioned, if the height of a slit is reduced to half the standard height, the stray light level is reduced to half the level resulting from the slit of the standard height, so that the relation between the concentration and absorbance of a sample can be kept substantially linear until a high absorbance is reached.

Figure 3:
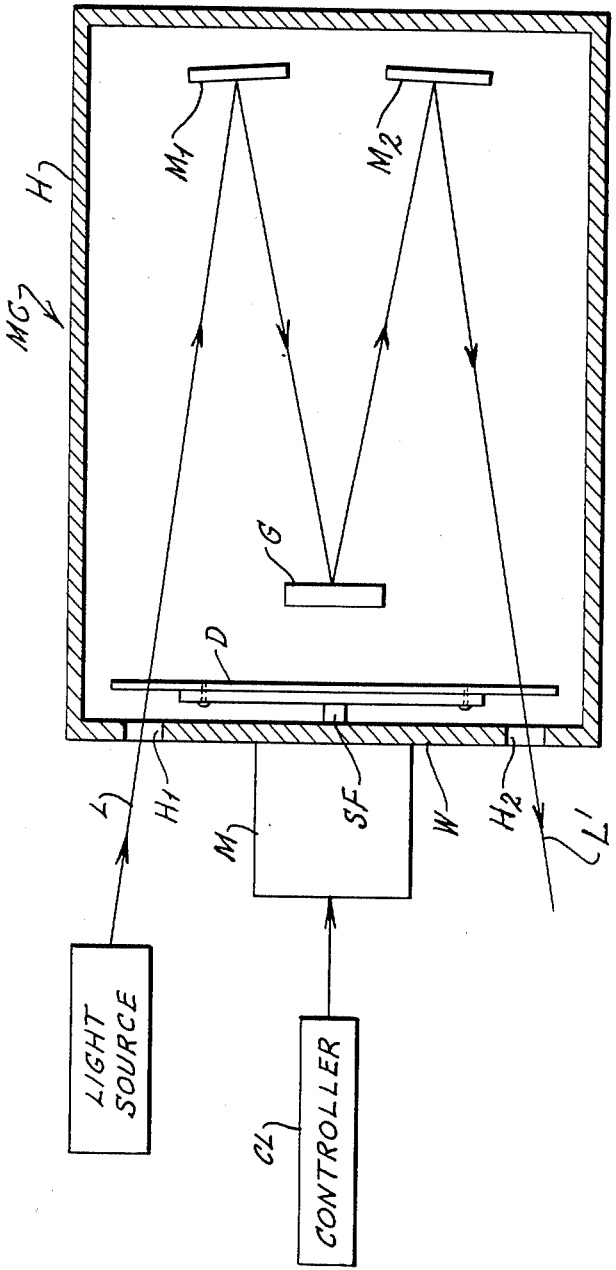
FIG. 3 is a schematic top plan view of a monochromator employing the slit disk of FIG. 1 or 2.

FIG. 3 schematically shows a monochromator MC provided with a slit mechanism constructed in accordance with the invention. The monochromator comprises a housing H provided in one end wall W with a pair of holes $H_1$ and $H_2$. A slit disk D fixedly mounted on a shaft SF is disposed adjacent the inner surface of the end wall W, so that the light L from a source enters the housing through the hole $H_1$ and passes through one of the slits in the slit disk. The light beam passing through the slit is reflected by a mirror $M_1$ disposed adjacent the opposite end wall of the housing and falls on a diffraction grating G.

The grating G disperses the light into different wavelengths, which are reflected by another mirror $M_2$ disposed adjacent the opposite end wall of the housing so as to reach the slit disk D, whereupon the monochromatic light L' of a selected one of the wavelengths passes through the corresponding one of the slits in the slit disk that is paired with the previously mentioned slit through which the light L entered the monochromator and then comes out of the monochromator through the other hole $H_2$ in the housing end wall W.

The shaft SF of the slit disk D is rotated by a pulse motor M, and a controller CL controls the motor M to rotate the disk D so as to bring a selected one of the pairs of slits into the optical path of the monochromator.

With the slit mechanism constructed in accordance with the invention, it is possible to change not only the width but also the height of the slit and to selectively perform two kinds of measurement, one with an increased output light intensity and a high degree of sensitivity, and the other with a reduced stray light level and a high optical signal-to-noise ratio.

What we claim is:

1. A slit mechanism for use in a monochromator, comprising:
    a plurality of discrete pairs of slits, the two slits in each pair having the same width and the same height and each pair having a same height and a different width from those of the other pairs, and at least one additional pair of slits having the same width as the width of, and a smaller height from the height of, a predetermined one of said plurality of pairs of slits said additional pair of slits having a slit height smaller than the slit heights of said pairs of slits; and means for defining said slits.

2. The slit mechanism of claim 1, wherein a means for defining said slits comprises a disk of rigid, opaque material and rotatable about an axis.

3. The slit mechanism of claim 2, wherein said pairs of slits are arranged on said disk circumferentially of a circle concentric with said axis so that the slits of each pair are positioned at diametrically opposite sides on said circle so as to serve as an entrance and an exit for said monochromator.

4. The slit mechanism of claim 2, wherein said pairs of slits further are arranged on said disk circumferentially of two circles of different diameters concentric with each other and a common said axis so that one slit of each said pair of slits is on one of said concentric circles while the other slit thereof is on the other of said concentric circles and diametrically opposite to said one slit.

5. A monochromator comprising:
    a light source; means for dispersing the light from said light source into different wavelengths; means for guiding said light from said light source to said dispersing means along a first optical path; means for guiding said dispersed light along a second optical path; a slit mechanism comprising first and second sets of slit pairs arranged on a disk in at least one circle with the two slits of each pair diametrically opposite of each other and being equal in width and height, and each pair of slits of said first set being equal in height and differing in width from remaining slit pairs of said first set, and at least one pair of slits of said second set having a slit width equal to a slit width of a particular pair of slits of said first set and a slit height less than a slit height of said particular pair of slits, so arranged that one slit of a selected pair of said pairs of slits is in one of said first and second optical paths while at the same time another slit of said selected pair of slits is in the other of said first and second optical paths; means for rotating said disk of said slit mechanism so that said one pair of slits in said first and second optical paths are replaced by another selected pair of said pairs of slits; and means for controlling the operation of said rotating means.

6. A monochromator as in claim 5, wherein said slit mechanism further comprises:
    said slit pairs being arranged in two concentric circles such that one slit of each pair is in one of said circles and the other slit of each pair is in a second of said circles and diametrically opposite of said one slit.

* * * * *